(12) United States Patent
Stuckey et al.

(10) Patent No.: US 12,036,533 B2
(45) Date of Patent: Jul. 16, 2024

(54) CATALYST SUPPORT

(71) Applicant: JEMMTEC LIMITED, Dewsbury (GB)

(72) Inventors: Mark Stuckey, Dewsbury (GB); Matthew Deakin, Dewsbury (GB); Richard Caulkin, Dewsbury (GB)

(73) Assignee: JEMMTEC LIMITED, Dewsbury (GB)

( * ) Notice: Subject to any disclaimer, the term of this patent is extended or adjusted under 35 U.S.C. 154(b) by 301 days.

(21) Appl. No.: 17/274,541

(22) PCT Filed: Sep. 9, 2019

(86) PCT No.: PCT/GB2019/052506
§ 371 (c)(1),
(2) Date: Mar. 9, 2021

(87) PCT Pub. No.: WO2020/053563
PCT Pub. Date: Mar. 19, 2020

(65) Prior Publication Data
US 2021/0339229 A1 Nov. 4, 2021

(30) Foreign Application Priority Data
Sep. 11, 2018 (GB) .................................. 1814749

(51) Int. Cl.
| | | |
|---|---|---|
| *B01J 23/755* | (2006.01) | |
| *B01J 8/02* | (2006.01) | |
| *B01J 19/30* | (2006.01) | |
| *B01J 21/04* | (2006.01) | |
| *B01J 35/00* | (2006.01) | |
| *B01J 35/02* | (2006.01) | |
| *B01J 35/04* | (2006.01) | |
| *B01J 35/30* | (2024.01) | |
| *B01J 35/40* | (2024.01) | |
| *B01J 35/56* | (2024.01) | |
| *B01J 37/00* | (2006.01) | |
| *B01J 37/02* | (2006.01) | |
| *B01J 37/04* | (2006.01) | |
| *B01J 37/08* | (2006.01) | |

(52) U.S. Cl.
CPC .............. *B01J 23/755* (2013.01); *B01J 8/02* (2013.01); *B01J 19/30* (2013.01); *B01J 21/04* (2013.01); *B01J 35/30* (2024.01); *B01J 35/40* (2024.01); *B01J 35/56* (2024.01); *B01J 37/0018* (2013.01); *B01J 37/0207* (2013.01); *B01J 37/04* (2013.01); *B01J 37/082* (2013.01); *B01J 2208/024* (2013.01); *B01J 2219/30296* (2013.01); *B01J 2219/30416* (2013.01); *B01J 2219/30475* (2013.01); *B01J 2219/3183* (2013.01)

(58) Field of Classification Search
CPC ... B01J 23/755; B01J 8/02; B01J 19/30; B01J 21/04; B01J 35/002; B01J 35/023; B01J 35/04; B01J 37/0018; B01J 37/0207; B01J 37/04; B01J 37/082
See application file for complete search history.

(56) References Cited

U.S. PATENT DOCUMENTS

| | | | |
|---|---|---|---|
| 8,263,518 B2 * | 9/2012 | Khare | ................ C10G 35/085 502/64 |
| 2005/0109241 A1 | 5/2005 | Addiego et al. | |
| 2006/0140843 A1 | 6/2006 | Sung et al. | |

FOREIGN PATENT DOCUMENTS

| | | |
|---|---|---|
| CN | 201815312 U | 5/2011 |
| WO | 2005037745 A1 | 4/2005 |
| WO | 2006027593 A2 | 3/2006 |
| WO | WO-2006027593 A2 * | 3/2006 ............. B01J 35/04 |

OTHER PUBLICATIONS

Hutchings, J. of Chemical Tech. Biotech., (1986), v36, p. 255-258 "Crushing strength as a diagnostic test for catalysts".*
Test method for Catalyst crush strength, D4179-22, updated Aug. 15, 2022 ASTM International.*
Great Britain Search Report for GB Appln. No. GB1814749.6 dated Mar. 29, 2019 (6 pages).
T. Chafik et al. "Easy extrusion of honeycomb-shaped monoliths using Moroccan natural clays and investigation of their dynamic adsorptive behavior toward VOCs", Journal of Hazardous Materials, vol. 170, dated May 6, 2009, pp. 87-95.
International Preliminary Examination Search Report (IPER) for PCT/GB2019/052506 dated Mar. 9, 2021 (7 pages).
International Search Report (ISR) for PCT/GB2019/052506 dated Nov. 7, 2019 (3 pages).
Written Opinion for PCT/GB2019/052506 dated Nov. 7, 2019 (6 pages).
English Translation of Chinese Office Action (CNOA) issued for CN App No. 2019800743594 dated Jul. 28, 2022 (12 pages).

* cited by examiner

*Primary Examiner* — Yong L Chu
(74) *Attorney, Agent, or Firm* — Shumaker, Loop & Kendrick, LLP (57) ABSTRACT

A packing member for use in a packed bed, preferably a support for use as a catalyst support in a packed bed reactor. The packing member includes ceramic material and has a geometric surface area per volume of $\geq 0.7$ cm$^2$/cm$^3$ and a side crush strength of $\geq 250$ kgf; or a geometric surface area per volume of $\geq 1.5$ cm$^2$/cm$^3$ and a side crush strength of $\geq 150$ kgf; or a geometric surface area per volume of $\geq 3$ cm$^2$/cm$^3$ and a side crush strength of $\geq 60$ kgf. The packing member optionally has a porosity of at least 6%, such as at least 15% or at least 20%.

27 Claims, 7 Drawing Sheets

CATALYST SUPPORT

FIELD

The present invention relates to packing members for packed beds, in particular to supports for catalysts. More specifically, the present invention relates to ceramic catalyst supports and supported catalysts for use in processes such as the steam reforming and the production of direct-reduced iron.

BACKGROUND

Metal catalysts used in industrial processes such as steam reforming and the production of direct-reduced iron are more active if finely divided into small particles to increase the metal surface area. A large metal surface area can be maintained during such reactions by spreading the metal particles across a refractory support. Another advantage of the use of catalyst supports in such processes is that only a small amount of the more expensive catalytic metals is required for dispersion onto a large amount of abundant inexpensive support materials, thereby considerably reducing the cost of catalytic materials required at commercial scale.

In many such processes the reaction requiring a catalyst is very fast and is limited to the pellet surface. The reaction will therefore depend on the geometric surface area of the supported catalyst. Additionally, a supported catalyst having low internal surface area (BET) and so small internal pore volume will generally suffer from lower activity in such processes. The strength of a support is also important as breakage during the loading, operation and discharge of the supported catalyst can reduce activity and increase delays and costs. For example, in the Midrex process for direct-reduced iron (DRI) the catalysts can be subject to high levels of mechanical handling and thermal cycling, as are steam reforming catalysts. Furthermore, the supported catalyst should provide good heat transfer characteristics while maintaining a low pressure drop.

Supports for catalysts in such industrial processes are typically made by extrusion, pelleting or granulation of ceramic powder followed by calcination of the green body.

However, it has been found that such methods can only offer restricted support geometry and physical properties. For example, such supports may achieve high strength, but only at the expense of low geometric surface area and poor porosity.

Therefore, there is a requirement for improved supports for catalysts having a better combination of desirable properties. Such improved catalysts should also be able to be produced economically. It is therefore an object of aspects of the present invention to address one or more of the above-mentioned or other problems.

SUMMARY

According to a first aspect of the present invention there is provided a packing member for use in a packed bed, preferably a support for use as a catalyst support in a packed bed reactor, wherein the packing member comprises ceramic material and wherein the packing member has a geometric surface area per volume of $\geq 0.7$ cm$^2$/cm$^3$ and a side crush strength of $\geq 250$ kgf; or a geometric surface area per volume of $\geq 1.5$ cm$^2$/cm$^3$ and a side crush strength of $\geq 150$ kgf; or a geometric surface area per volume of $\geq 3$ cm$^2$/cm$^3$ and a side crush strength of $\geq 60$ kgf, and wherein the packing member optionally has a porosity of at least 6%, such as at least 15% or at least $\geq 0\%$.

The packing member may be a catalyst support, suitably a ceramic catalyst support.

The packing member may have a geometric surface area per volume (GSA) of $\geq 0.7$ cm$^2$/cm$^3$ and a side crush strength of $\geq 250$ kgf; such as a GSA of $\geq 1$ cm$^2$/cm$^3$, preferably a GSA of $\geq 1.2$ cm$^2$/cm$^3$, more preferably a GSA of $\geq 1.3$ cm$^2$/cm$^3$, most preferably a GSA of $\geq 1.4$ cm$^2$/cm$^3$. The packing member may have a side crush strength of $\geq 275$ kgf, preferably $\geq 300$ kgf, more preferably $\geq 325$ kgf, most preferably $\geq 350$ kgf.

The packing member may have a geometric surface area per volume of $\geq 1.5$ cm$^2$/cm$^3$ and a side crush strength of $\geq 150$ kgf; such as a GSA of $\geq 1.7$ cm$^2$/cm$^3$, preferably a GSA of $\geq 1.9$ cm$^2$/cm$^3$, more preferably a GSA of $\geq 2.1$ cm$^2$/cm$^3$, most preferably a GSA of $\geq 2.3$ cm$^2$/cm$^3$. The packing member may have a side crush strength of $\geq 170$ kgf, preferably $\geq 185$ kgf, more preferably $\geq 200$ kgf, most preferably $\geq 215$ kgf.

The packing member may have a geometric surface area per volume of $\geq 3$ cm$^2$/cm$^3$ and a side crush strength of $\geq 60$ kgf, such as a GSA of $\geq 3.3$ cm$^2$/cm$^3$, preferably a GSA of $\geq 3.6$ cm$^2$/cm$^3$, more preferably a GSA of $\geq 3.9$ cm$^2$/cm$^3$, most preferably a GSA of $\geq 4.2$ cm$^2$/cm$^3$. The packing member may have a side crush strength of $\geq 70$ kgf, preferably $\geq 80$ kgf, more preferably $\geq 90$ kgf, most preferably $\geq 100$ kgf.

GSA per volume herein is calculated by measuring the external dimensions of the packing member, including all macrostructure and surface structure features and calculating the surface area. The calculated surface area is then divided by the calculated volume of the packing member. Suitable 3D modelling software can be used to provide these calculations quickly and accurately.

Side crush strength herein is represented by a value given in kgf. This is the maximum load recorded at the point of failure of the sample when pressed & crushed between two parallel, flat, hardened steel plates of minimum diameter 80 mm. One plate is fixed to a load cell & recording device, and the other is attached to a ram which moves at a controlled rate of 5 mm/minute. Initial trial tests are carried out to determine the dimension in which the packing member is weakest. The side crush test is then carried out in the weakest direction.

The packing member may have a porosity of $\geq 6\%$, preferably $\geq 15\%$, more preferably $\geq 20\%$, most preferably $\geq 25\%$. The packing member may have a porosity of from 6 to 50%, preferably from 15 to 40%, more preferably from 20 to 35%, most preferably from 25 to 30%. Suitably, the support has a porosity of $\geq 15\%$, more preferably $\geq 20\%$, most preferably $\geq 25\%$. The support may have a porosity of from 15 to 50%, more preferably from 20 to 40%, most preferably from 25 to 35%.

Porosity herein is measured by mercury intrusion porosimetry, using ASTM D4284—12(2017)e1, Standard Test Method for Determining Pore Volume Distribution of Catalysts and Catalyst Carriers by Mercury Intrusion Porosimetry.

The packing member suitably has a macrostructure and surface structures on the outer face of the macrostructure.

The macrostructure may be in the form of a multi-lobe, for example a trilobe, quadralobe or pentalobe; a ring; a sphere; a cube; a cuboid; a cylinder; or a cog.

The cog macrostructure comprises a plurality of castellations extending radially outwards. A cog macrostructure may have lateral cross-sections that include substantially circular, triangular, square or rectangular etc when excluding the castellations. At least some, and preferably all, of the castellations may be tapered along the depth and/or the width of the castellation, preferably each castellation is tapered in the same direction as the other castellations of the cog, suitably the widest and deepest points of the castellation are toward the same end of the castellation.

The macrostructure may have a depressed upper and/or lower face, suitably at least 30% of the upper and/or lower face is depressed, such as at least 40% or at least 50%. It will be appreciated that a bore extending through the macrostructure is not a depression in the upper and/or lower face according to the present invention.

Advantageously, a cog macrostructure having tapered castellations and/or depressed upper or lower face has been found to provide improved packing density in combination with reduced interlocking.

A spherical macrostructure may comprise at least one linear trough on the outer face of the macrostructure, such as at least two, at least three or at least four linear troughs. Preferably, a spherical macrostructure comprises at least two linear parallel troughs, such as at least three or at least four. Preferably, the troughs are substantially hemispherical in a lateral cross-section.

The macrostructure may be a monolith or comprise one or more bores extending through the macrostructure. Preferably, the packing member comprises at least one bore extending through the macrostructure, more preferably, the macrostructure comprises at least three bores. The macrostructure may be a honeycomb structure. The bores of the macrostructure may be straight cut or faceted.

The packing member may comprise a plurality of surface structures, suitably a plurality of repeating surface structures. Preferably, the packing member comprises at least 5 surface structures, suitably repeating surface structure moieties, more preferably at least 10, such as at least 15, or at least 20, most preferably at least 25.

By surface structures it is meant raised and/or depressed portions on the support the height of which are significantly smaller than the width/diameter of the macrostructure of the packing member. Such surface structures may be considered to be surface texturing over the macrostructure of the packing member. The surface structures may be considered to not include microscopic surface roughness. For example, the packing member may be of cuboidal macrostructure having a width of 32 mm and a length of 50 mm. The outer face of this packing member may comprise a plurality of surface structures in the form of a plurality of repeating identical discrete mounds wherein each mound has a height of 2 mm. It will be appreciated that normal features of a macrostructure such as the plurality of castellations of a cog or the lobes of multilobe are not considered to be surface structures according to the present invention.

The surface structures may be in the form of ridges and/or mounds.

The ridges may be in the form of annular ridges, wherein said annular ridges are not restricted to a circular shape. The annular ridges may be in the form of a substantially circular shape or a regular convex polygon, such as a triangle, square, pentagon, hexagon, heptagon, octagon, nonagon, or decagon. Preferably the annular ridges are in the form of a regular convex polygon, more preferably pentagon, hexagon or heptagon, most preferably hexagon. The portion of the surface structure extending between the annular ridges may be flat, sloped and/or curved. For example, the portion of the surface structure extending between the annular ridges may be in the form of an inverted pyramid. The surface structures may comprise a plurality of attached annular ridge structures, suitably interconnected annular ridge structures such that a ridge of at least a first annular surface structure forms part of a second annular surface structure.

The surface structures in the form of mounds may be depressed into the macrostructure or project outwardly from the macrostructure. The mounds may be curved, pyramidal and/or stepped mounds. A stepped mound may comprise between 2 to 10 steps, such as between 3 and 8 steps. The mounds may interconnect such that adjacent mounds abut or are merged together.

The mean average height of the surface structures of the packing member may be up to 10 mm, preferably up to 7 mm, more preferably up to 6 mm, most preferably up to 5 mm.

The mean average height of the surface structures of the packing member may be at least 0.1 mm, such as at least 0.3 mm, preferably at least 0.5 mm, more preferably at least 0.7 mm, most preferably at least 0.8 mm. The height of the surface structures herein is measured using callipers with a depth measurement function.

The packing member may have a largest dimension of up to 1000 mm, such as up to 750 mm or up to 500 mm, preferably up to 400 mm. The packing member may comprise a width/diameter of up to 500 mm, such as up to 300 mm, or up to 200 mm, preferably up to 150 mm, more preferably up to 100 m, most preferably up to 50 mm.

The mean average height the surface structures of the packing member may be up to 40% of the width/diameter of the packing member, such as up to 30%, preferably up to 25%, more preferably up to 20% and most preferably up to 15%.

The surface structures may extend over at least two faces of the packing member, such as at least a side face and a top face and/or bottom face.

The surface structures may extend over at least 50% of the side face of the packing member, such as at least 60%, preferably at least 70%, more preferably at least 80% and most preferably at least 85%. The surface structures may extend over at least 50% of the outer face of the packing member, such as at least 60%, preferably at least 70%, more preferably at least 80% and most preferably at least 85%. Where the surface structures include a repeating series of ridges, such as annular ridges, the surface extending between the ridges is included as part of the surface structure for this calculation even when that surface is substantially flat or where the ridges are not interconnected.

Advantageously, the packing member of the present invention provides improved geometric surface area whilst still providing excellent strength. Further, the strength and/or porosity of the packing member of the invention may be modified whilst keeping the same shape and thereby reducing redesign requirements and cost. Furthermore, the packing member of the present invention may provide for highly porous supports whilst still providing excellent strength. Most advantageously, the packing member of the present invention may provide improved geometric surface area in combination with excellent strength and high levels of porosity. The improved geometric surface area of the packing member of the present invention is particularly advantageous for applications in which the catalytic reaction is surface based.

Packing members of the present invention can also provide a high heat transfer co-efficient in combination with other improved properties, such as improved packing.

The packing member of the present invention may also be used to provide excellent packing characteristics with low pressure drop. The packing member of the present invention may provide improved packing density whilst maintaining optimum gas flow.

The packing member of the present invention may be a cast packing member, such as a gel cast packing member. Preferably, the surface structures of the packing member are formed during the moulding step of the packing member, i.e. the step in which the green body of the packing member is formed, suitably by appropriate formations provided in the shape of the mould. As such, preferably the surface structures are not post-fabricated after the moulding of the green body of the packing member.

According to a second aspect of the present invention, there is provided a packing member for use in a packed bed, preferably a support for use as a catalyst support in a packed bed reactor, wherein the packing member is obtainable by gel casting a composition comprising a ceramic material, an organic binder component and optionally a pore forming component.

Suitable features of the second aspect of the present invention are as described above in relation to the first aspect of the present invention.

The packing member of the first or second aspect may be formed from a cast moulding composition, preferably a gel cast moulding composition. The packing member may be formed from a moulding composition comprising an organic binder component, a ceramic material, and optionally a pore forming component.

The organic binder component may be operable to be substantially removed from the packing member after moulding of the packing member, preferably with heat treatment, more preferably removed during calcination of the packing member.

The organic binder component may comprise a polymerisable component, suitably including a polymerisable monomer and a crosslinking member, wherein the binder component is operable to polymerise to from a (co)polymer.

The polymerisable monomer may comprise one or more type of ethylenically unsaturated monomers, such as an acrylic monomer or derivative thereof such as an acrylamide monomer, and/or a vinyl monomer, such as a monomer selected from one or more of methacrylamide (MAM), N-(hydroxymethyl)acrylamide (hMAM), hydroxyethyl acrylamide (hEAM) and/or N-vinyl-2-pyrrolidinone (NVP). Preferably, the polymerisable monomer comprises one or more acrylamide monomers, more preferably a monomer selected from one or more of methacrylamide (MAM), N-(hydroxymethyl)acrylamide (hMAM) and hydroxyethyl acrylamide (hEAM). Most preferably, the polymerisable monomer comprises MAM.

The crosslinking member may be selected from one or more of a diethylenically unsaturated monomer, such as a diacrylic monomer or derivative thereof such as a diacrylamide monomer; an acrylic salt and/or a polyethylene glycol substituted acrylic monomer. The crosslinking member may be selected from one or more of poly(ethylene glycol) dimethacrylate (PEGDMA), N,N'-methylenebis(acrylamide) (BIS), ammonium acrylate and PEG methylethylmethacrylate (PEGMEM), preferably one more of poly(ethylene glycol) dimethacrylate (PEGDMA), and N,N'-methylenebis(acrylamide) (BIS).

The organic binder component may be formed from 40 to 95 wt % of polymerisable monomer and from 60 to 5 wt % of crosslinking member, such as from 50 to 90 wt % of polymerisable monomer and from 50 to 10 wt % of crosslinking member, or from 55 to 85 wt % of polymerisable monomer and from 45 to 15 wt % of crosslinking member, or from 60 to 80 wt % of polymerisable monomer and from 40 to 20 wt % of crosslinking member, such as from 65 to 75 wt % of polymerisable monomer and from 35 to 25 wt % of crosslinking member.

The composition may further comprise a polymerisation accelerator, operable to accelerate the polymerisation of the binder component. The polymerisation accelerator may be any suitable accelerator. For example, the accelerator may be tetramethylethylenediamine (TEMED).

The composition may further comprise an initiator operable to initiate polymerisation of the binder component. The initiator may be any suitable initiator.

The initiator may be a free radical initiator. For example, the initiator may be ammonium persulphate and/or potassium persulphate.

The pore forming material may be operable to be removed from the packing member after moulding of the packing member, preferably with heat treatment, more preferably during calcination of the packing member. The pore forming material may be selected from one or more of microbeads, starch, seeds and/or cellulose.

The pore forming material may have a particle size distribution wherein D10 is from 5 to 100 µm, preferably from 10 to 75 µm, more preferably from 15 to 50 µm, most preferably from 20 to 40 µm. The D50 of the pore forming material may be from 50 to 200 µm, preferably from 75 to 175 µm, more preferably from 90 to 160 µm, most preferably from 100 to 150 µm. The D90 of the pore forming material may be from 120 to 300 µm, preferably from 150 to 270 µm, more preferably from 170 to 250 µm, most preferably from 185 to 235 µm.

The ceramic material may be a refractory ceramic material. The ceramic material may comprise aluminium oxide, aluminium silicate, magnesium aluminate, calcium aluminate, zirconia, silica, titanate, carbon and/or magnesium oxide.

The ceramic material may have a particle size distribution wherein D10 is from 0.1 to 20 µm, preferably from 0.5 to 10 µm, more preferably from 1 to 5 µm, most preferably from 1.5 to 3 µm. The D50 of the pore forming material may be from 0.5 to 30 µm, preferably from 1 to 25 µm, more preferably from 1.5 to 20 µm, most preferably from 2 to 15 µm. The D90 of the pore forming material may be from 10 to 100 µm, preferably from 15 to 80 µm, more preferably from 20 to 70 µm, most preferably from 25 to 60 µm.

The ceramic material may be a ceramic powder. The ceramic powder may be ball milled or spray dried. Advantageously, it has been found that ball milled or spray dried ceramic powder provides easier casting behaviour.

The composition or packing member may comprise a promoter, operable to increase the reactivity of the main reaction, and/or decrease undesirable side reactions. The promoter may be selected from one or more of oxides of lanthanum, copper, magnesium, manganese, potassium, calcium, zirconium, barium, cerium, sodium, lithium, molybdenum, yttrium, cobalt, and chromium.

The composition may further comprise a carrier, such as aqueous carrier. Suitably the composition is an aqueous ceramic slurry.

The composition may comprise further additives. For example, the composition may comprise a dispersant, such as a polymeric salt, for example a salt of a polyacrylic, preferably an ammonium salt of a polyacrylic. A suitable dispersant may be selected from one or more of ECodis P90, Narlex LD42 and Dispex A40.

The composition may comprise from 0.1 to 10% of polymerisable monomer by dry weight of the composition, preferably from 0.5 to 8 wt %, more preferably from 1 to 6 wt %, such as from 1.5 to 5 wt %, most preferably from 2 to 4 wt %.

The composition may comprise from 0.1 to 10% of crosslinking member by dry weight of the composition, preferably from 0.5 to 8 wt %, more preferably from 0.75 to 6 wt %, such as from 1 to 5 wt %, most preferably from 1 to 4 wt %.

The composition may comprise from 50 to 95% of ceramic material by dry weight of the composition, preferably from 50 to 90 wt %, more preferably from 55 to 85 wt %, most preferably from 60 to 80 wt %. The packing member may comprise at least 75% of ceramic material by dry weight of the composition, preferably at least 85 wt %, more preferably at least 90 wt %, such as at least 95 wt %, most preferably at least 97 wt % ceramic material.

The composition may comprise from >0 to 40% of pore forming member by dry weight of the composition, preferably from 0.5 to 30 wt %, more preferably 2 to 25 wt %, such as from 3 to 20 wt %, most preferably from 4 to 15 wt %.

The composition may comprise from 0.1 to 5% of initiator by dry weight of the composition, preferably from 0.5 to 4 wt %, more preferably from 0.75 to 3.5 wt %, most preferably from 1 to 3 wt %.

The composition may comprise up to 5% of accelerator by dry weight of the composition, preferably up to 3 wt %, more preferably up to 2 wt %, most preferably up to 1.5 wt %.

The composition may comprise from 0.1 to 10% of dispersant by dry weight of the composition, preferably from 0.5 to 8 wt %, more preferably 0.75 to 6 wt %, most preferably from 1 to 5 wt %.

The composition may have a solids content of from 45 to 99% by total weight of the composition, such as from 50 to 95 wt %, preferably from 55 to 90 wt %, most preferably from 60 to 85 wt %.

The composition may be formed by combining a preformed aqueous binder component with a ceramic composition. Suitably the aqueous binder component comprises a polymerisable monomer, a crosslinking member and water.

The packing member of the present invention may be an inert packing member. As such, the inert packing member may be substantially free of catalytic material. Advantageously, the use of inert packing member according to the present invention in a catalyst bed provides improved heat transfer and gas flow turbulence which helps the reactive media further along the reactor to be at a suitable temperature for the desired reaction.

The packing member, or support, of the present invention may be a supported catalyst with the inclusion of catalytic material. The catalytic material is suitably operable to provide catalytic activity in desired process to which the supported catalyst is applied.

According to a third aspect of the present invention there is provided a supported catalyst, wherein the supported catalyst comprises ceramic material and catalytic material, and wherein the supported catalyst has a geometric surface area per volume of ≥0.7 $cm^2/cm^3$ and a side crush strength of ≥250 kgf; or a geometric surface area per volume of ≥1.5 $cm^2/cm^3$ and a side crush strength of ≥150 kgf; or a geometric surface area per volume of ≥3 $cm^2/cm^3$ and a side crush strength of ≥60 kgf, and wherein the supported catalyst optionally has a porosity of at least 8%, such as at least 15% or at least ≥0%.

According to a fourth aspect of the present invention, there is provided a supported catalyst, wherein the supported catalyst is obtainable by gel casting a composition comprising a ceramic material, an organic binder component and optionally a pore forming component.

Suitable features of the third and fourth aspects of the present invention are as described above in relation to the first and second aspects of the present invention.

The catalytic material may comprise a metal selected from one or more of a transition metal, suitably a transition metal oxide, and/or a noble metal, suitably an alloy thereof. The catalytic material may comprise a metal selected from one or more of iron, nickel, silver, gold, platinum, ruthenium, vanadium, molybdenum, and cobalt.

According to a fifth aspect of the present invention there is provided a method for producing a packing member, such as a support, or a supported catalyst, suitably a packing member according to the first or second aspect of the present invention or a supported catalyst according to the third or fourth aspect of the present invention, comprising the steps of:
a. contacting a composition for producing a packing member or supported catalyst, suitably a composition as defined in relation to the first or second aspect, with an initiator and optionally a polymerisation accelerator;
b. arranging the resulting composition of step (a) in a mould;
c. demoulding the composition to produce a green body,
d. optionally, drying the green body at room temperature or baking the green body at elevated temperature;
e. calcining the green body;
f. optionally, impregnating the packing member with a catalytic material.

The composition may be mixed before arranging in the mould to form a homogeneous slurry, suitably before addition of initiator and the optional accelerator. The composition may be mixed after addition of the initiator and the optional accelerator to form a homogeneous slurry.

The mould is preferably a cast mould. The mould may be operable to form surface structures on the green body.

The green body produced by step (c) may be dried by baking the green body at ≥40° C., such as ≥50° C. or ≥55° C. or ≥60° C. Suitably, the green body may be baked for ≥10 hours, such as ≥15 hours or ≥20 hours, for example ≥24 hours.

The green body may be calcined at ≥1000° C., preferably ≥1200° C., more preferably ≥1400° C., most preferably ≥1500° C. Suitably, the green body is fired until substantially all of the binder and pore forming component has been removed from the support or supported catalyst.

The packing member may be impregnated with catalytic material by dipping the packing member into a solution of the catalytic material. The dipped packing member may be dried after dipping.

Advantageously, the present invention enables the green support or supported catalyst body to be removed from the mould while it is in a form that is still relatively rubbery, allowing for easier handling. This leads to a lower scrap rate than other types of casting techniques.

According to a sixth aspect of the present invention there is provided a method for producing a packing member, such as a support for a catalyst, or supported catalyst, suitably a packing member according to the first or second aspect of the present invention or a supported catalyst according to the third or fourth aspect of the present invention, the method comprising the steps of:

a. optionally, producing a digital model of a packing member or support catalyst;
b. producing a precursor according to the model using additive manufacturing, preferably printing with a 3D printer,
c. forming a cast mould from the precursor;
d. cast moulding a moulding composition, suitably a moulding composition as defined in relation to the first or second aspect, to form a packing member or supported catalyst; suitably according to the method of the fifth aspect of the present invention.

According to a seventh aspect of the present invention there is provided a reactor comprising a catalyst bed wherein the catalyst bed comprises a packing member, suitably a support, according to the first or second aspect of the present invention and/or a supported catalyst according to the third or fourth aspect of the present invention.

According to an eighth aspect of the present invention there is provided a reaction medium comprising a catalyst bed wherein the catalyst bed comprises a packing member according to the first or second aspect of the present invention and/or a supported catalyst according to the third or fourth aspect of the present invention.

Suitably, the reactor or reaction medium is for the production of synthesis gas, such as ammonia, methanol, hydrogen, hydrogen peroxide and/or oxoalcohols; direct reduction of iron (DRI); endothermic gas generation; catalytic partial oxidation; or autothermal reforming.

According to a ninth aspect of the present invention there is provided the use of a packing member, suitably a support, according to the first or second aspect of the present invention as a catalyst support.

According to a tenth aspect of the present invention, there is provided a method for the production of a synthesis gas, such as ammonia, methanol, hydrogen, hydrogen peroxide and/or oxoalcohols comprising the use of a reactor comprising a catalyst bed wherein the catalyst bed comprises a packing member according to the first or second aspect of the present invention and/or a supported catalyst according to the third or fourth aspect of the present invention to produce the synthesis gas.

According to an eleventh aspect of the present invention, there is provided a method for the production of direct reduced iron comprising the use of a reactor comprising a catalyst bed wherein the catalyst bed comprises a packing member according to the first or second aspect of the present invention and/or a supported catalyst according to the third or fourth aspect of the present invention to produce the direct reduced of iron.

According to a twelfth aspect of the present invention, there is provided a method for endothermic gas generation comprising the use of a reactor comprising a catalyst bed wherein the catalyst bed comprises a packing member according to the first or second aspect of the present invention and/or a supported catalyst according to the third or fourth aspect of the present invention.

According to a thirteenth aspect of the present invention, there is provided a method for catalytic partial oxidation comprising the use of a reactor comprising a catalyst bed wherein the catalyst bed comprises a packing member according to the first or second aspect of the present invention and/or a supported catalyst according to the third or fourth aspect of the present invention.

According to a fourteenth aspect of the present invention, there is provided a method for catalytic partial oxidation comprising the use of a reactor comprising a catalyst bed wherein the catalyst bed comprises a packing member according to the first or second aspect of the present invention and/or a supported catalyst according to the third or fourth aspect of the present invention.

According to a fifteenth aspect of the present invention, there is provided a method for autothermal reforming comprising the use of a reactor comprising a catalyst bed wherein the catalyst bed comprises a packing member according to the first or second aspect of the present invention and/or a supported catalyst according to the third or fourth aspect of the present invention.

Any numerical range recited herein is intended to include all sub-ranges subsumed therein. Singular encompasses plural and vice versa. For example, although reference is made herein to "a" support, "an" organic binder, "a" polymerisable monomer, and the like, one or more of each of these and any other components can be used. As used herein, the term "polymer" refers to oligomers and both homopolymers and copolymers, and the prefix "poly" refers to two or more.

All of the features contained herein may be combined with any of the above aspects in any combination.

For a better understanding of the invention, and to show how embodiments of the same may be carried into effect, reference will now be made, by way of example, to the following experimental data and figures.

DETAILED DESCRIPTION

Figure 1A:
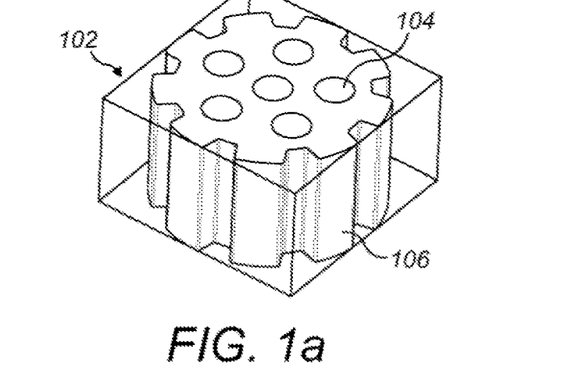
FIGS. 1a, 1b, and 1c show perspective views of two supported catalysts and one inert packing member that are not according to the present invention.

FIG. 1a shows high activity supported catalyst 102 for DRI production not according to the present invention having a cylindrical cog macrostructure with no surface structures and having a plurality of bores 104 extending through the longitudinal length of the support and a plurality of spaced longitudinally orientated castellations 106 that project radially outwards from the support.

Figure 1B:
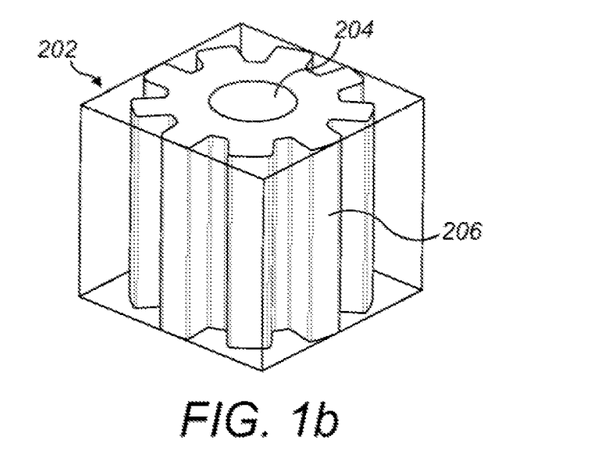

FIG. 1b shows a semi-active supported catalyst 202 for DRI production not according to the present invention having the same shape as support catalyst 102 with the exception that supported catalyst 202 has only one longitudinally extending bore 204, which is a central bore, and is approximately twice the height of support catalyst 102.

Figure 1C:
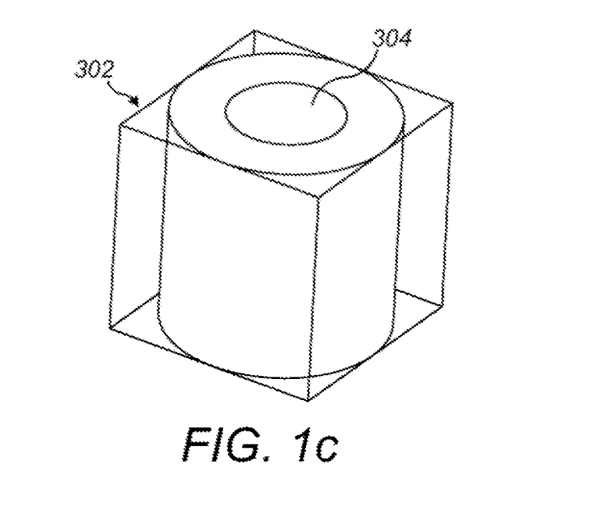

FIG. 1c shows an inert packing member 302 not according to the present invention having a cylindrical macrostructure with no surface structures and having a single central longitudinal extending bore 304.

Figure 2A:
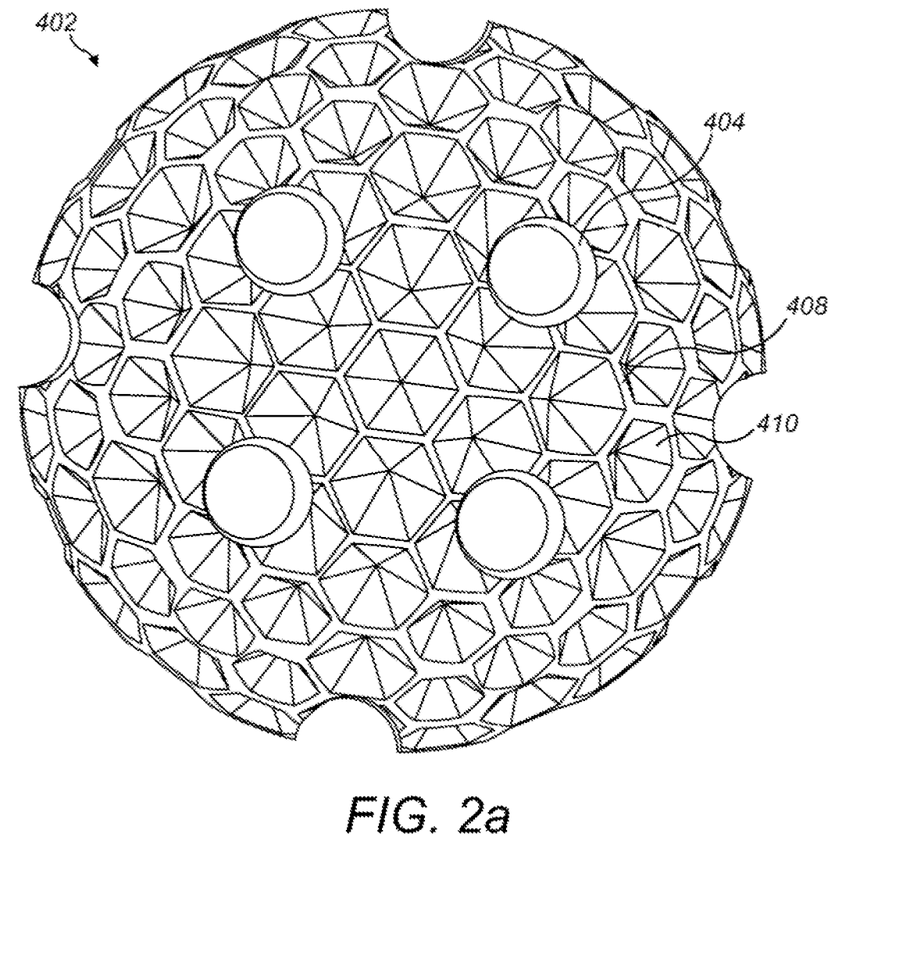
FIGS. 2a and 2b show a top view and a perspective view, respectively, of a first embodiment of catalyst support according to the present invention.
Figure 2B:
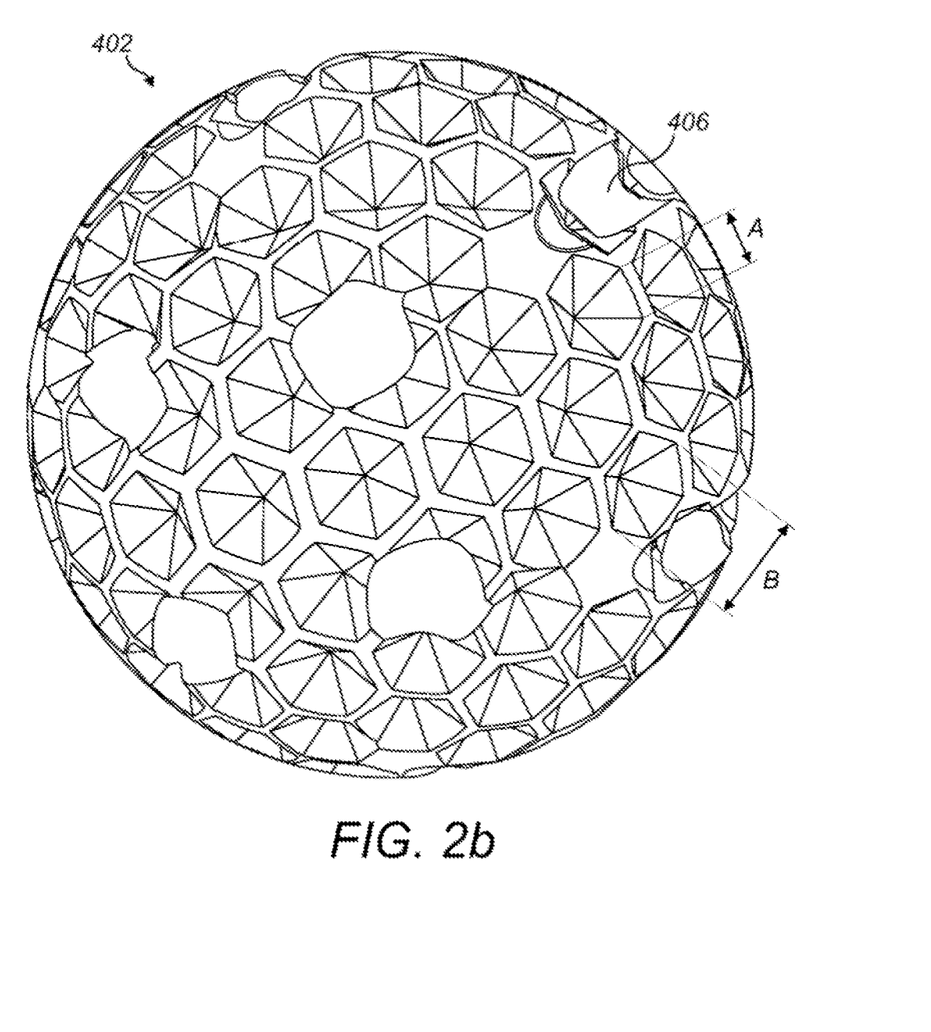

FIGS. 2(a) and (b) show a support 402 according to a first embodiment of the present invention having a spherical macrostructure with four equally spaced parallel bores 404 extending between opposite sides of the support. The support 402 further has four equally spaced parallel hemispherical troughs 406 on the outer face of the support. The troughs each have a radius of 2 mm. The outer face of the support 402 has a plurality of interconnected hexagon-shaped ridged surface structures 408 extending over substantially the whole of the outer face. The inner width B of the hexagon shaped ridge is 5.21 mm and inner the length A of each side is 2.61 mm. The portion of the surface structure that extends between the inner edges of ridges 410 is formed of an open ended inverted hexagonal pyramid. The depth of each surface structure is 2 mm.

Figure 3:
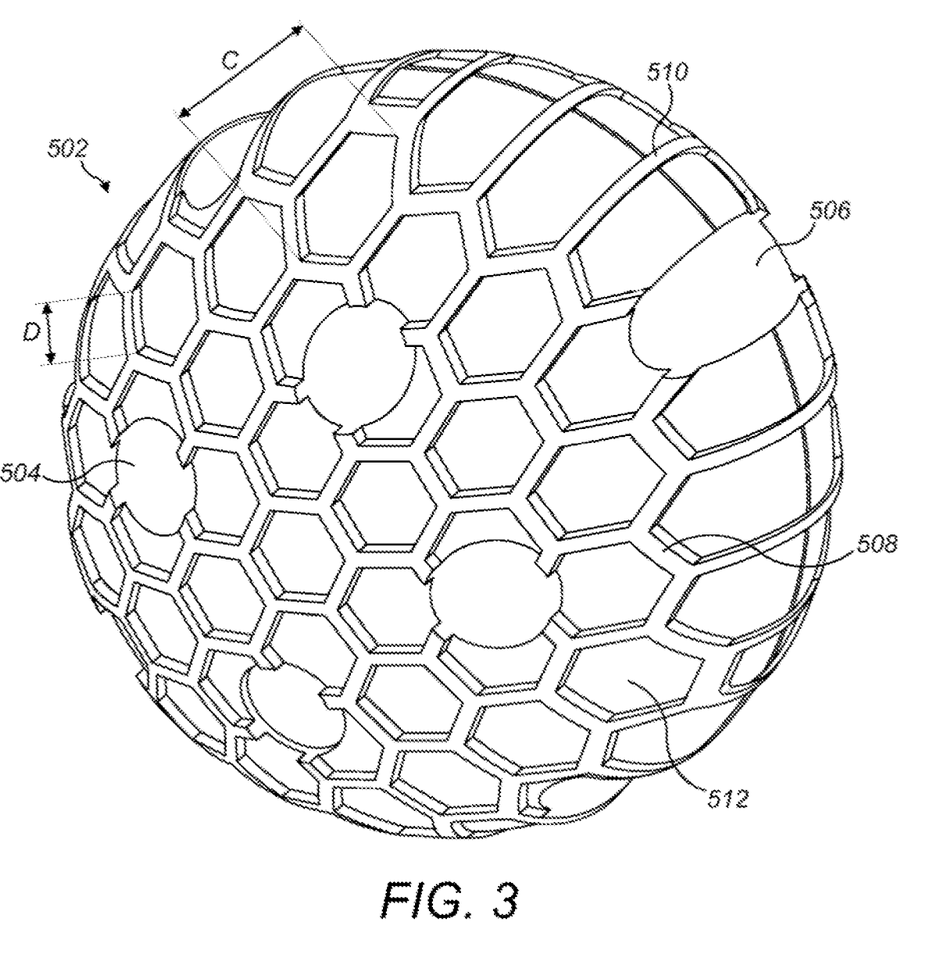
FIG. 3 shows a perspective view of a second embodiment of a catalyst support according to the present invention.

FIG. 3 shows a support 502 according to the present invention also having a spherical macrostructure. Support 502 also has four equally spaced parallel bores 504 extending between opposite sides of the support and four equally spaced parallel hemispherical grooves 506 on the outer face of the support 502 each having a radius of 2 mm. The surface structures of support 502 are in the form of a two portions having a plurality of interconnected hexagon-shaped ridges 508 extending across opposite sides of the support 502. The inner width D of the hexagon shaped ridges are 6.93 mm and inner the length C of each side is 3.46 mm. Connecting these portions of hexagonal surface structures are further surface structures in the form of a plurality of substantially evenly spaced parallel ridges 510. The portion 512 of the surface structure that extends between the ridges 508 is substantially flat, except for the curvature of the macrostructure of the support.

Figure 4A:
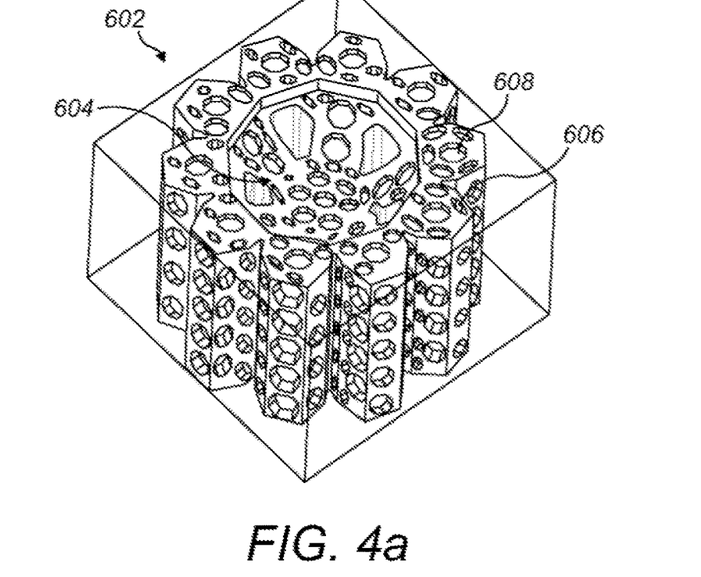
FIGS. 4a and 4b show perspective views of a first embodiment of a supported catalyst according to the present invention.
Figure 4B:
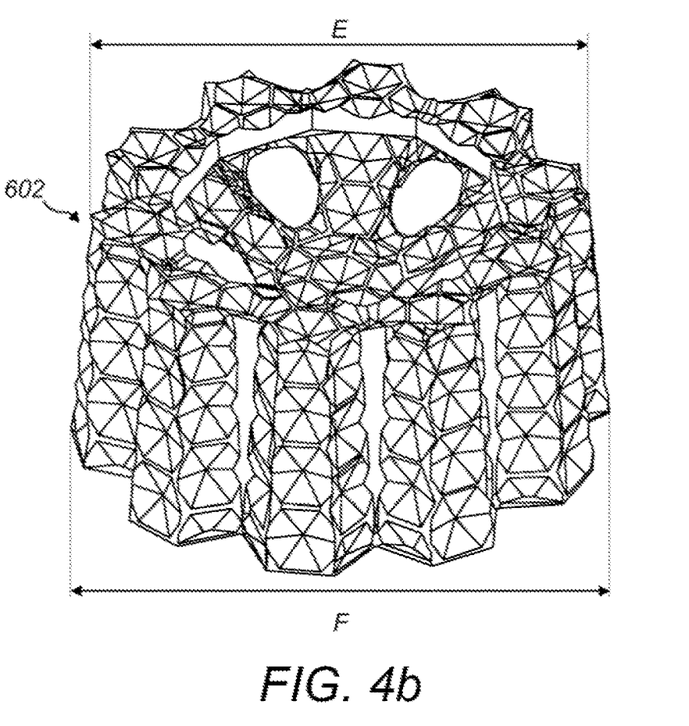

FIGS. 4a to 4b show a high activity supported catalyst 602 for DRI production according to the present invention. Supported catalyst 602 has a similar macrostructure to comparative supported catalyst 102 in that the supported catalyst 602 has a macrostructure having a cylindrical cog shape with a plurality of bores (5 in total) extending through the longitudinal length of the support and a plurality of spaced longitudinally orientated castellations (10 in total) that project radially outwards from the support. The macrostructure of supported catalyst 602 differs from that of 102 because the macrostructure of support catalyst 602 further has a depression 604 in the upper face of the support 602. Furthermore, each of the castellations of the cog are tapered in depth such that the supported catalyst 602 has a largest outer width F at the base (38.0 mm) to a smallest outer width E at the upper face of supported catalyst 602 (35.1 mm). Each castellation is further tapered in width, from a widest point at the base of supported catalyst 602 to a narrowest width at the upper face of supported catalyst 602.

Unlike supported catalyst 102, which has a substantially smooth outer face with no surface structures, support catalyst 602 has surface structures extending over substantially the whole outer face of the supported catalyst 602. The surface structures are generally in the form of interconnected hexagon-shaped ridges 606 in which the portions 608 of the surface structures extending between the ridges are substantially flat.

Figure 5:
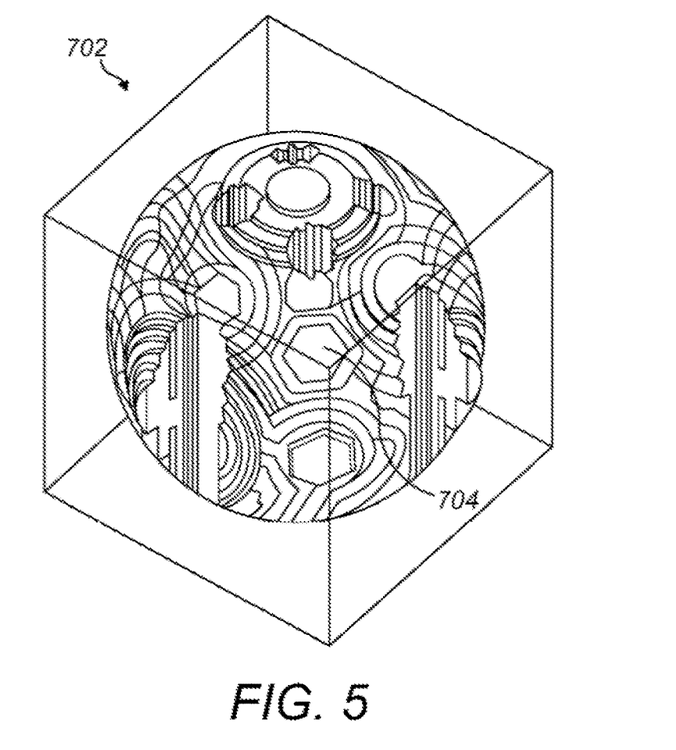
FIG. 5 shows a perspective view of a second embodiment of a supported catalyst according to the present invention.

FIG. 5 shows a semi-active supported catalyst 702 for DRI production according to the present invention. Supported catalyst 702 has the same macrostructure as support 402 but has different surface structures. The surface structures of supported catalyst 702 are in the form of a plurality of overlapping stepped mounds 704 extending across substantially the whole outer face of the supported catalyst 702.

Figure 6:
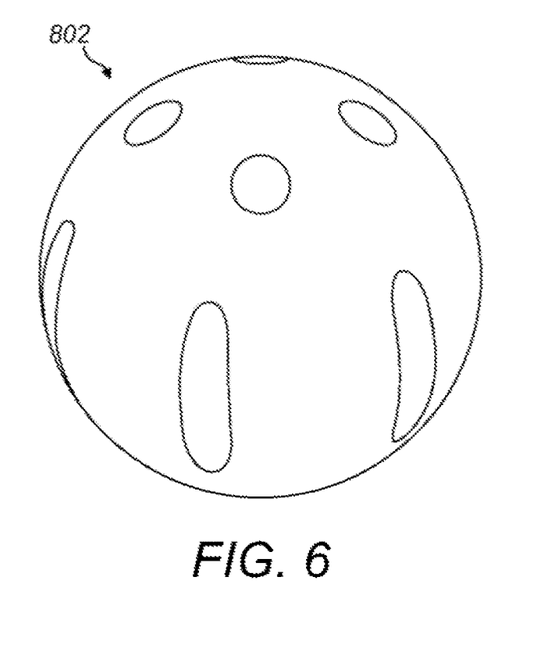
FIG. 6 shows a perspective view of a first embodiment of an inert packing member according to the present invention.

FIG. 6 shows an inert packing member 802 according to the present invention that has the same macrostructure and surface structures as supported catalyst 702 except that member 802 has a smooth outer surface with no surface structures.

Figure 7A:
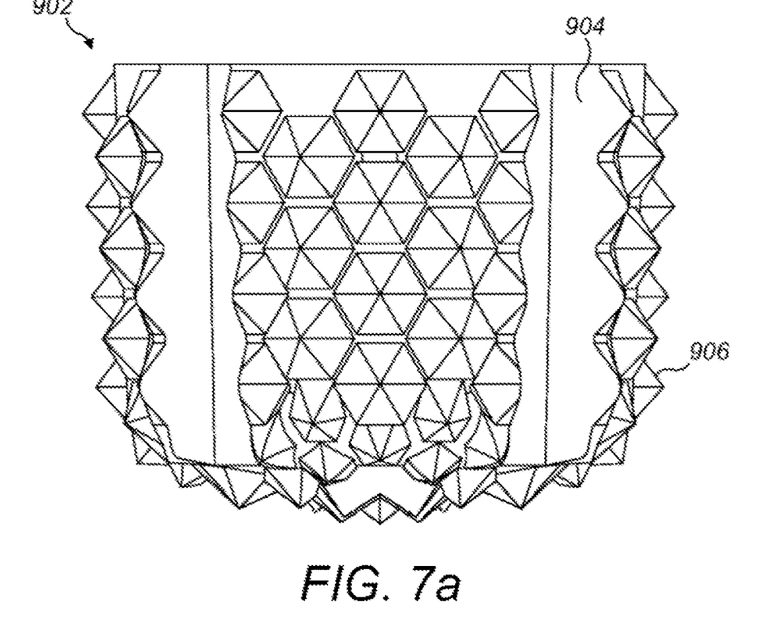
FIGS. 7a and 7b show a side and perspective view, respectively, of a fourth embodiment of a supported catalyst according to the present invention.
Figure 7B:
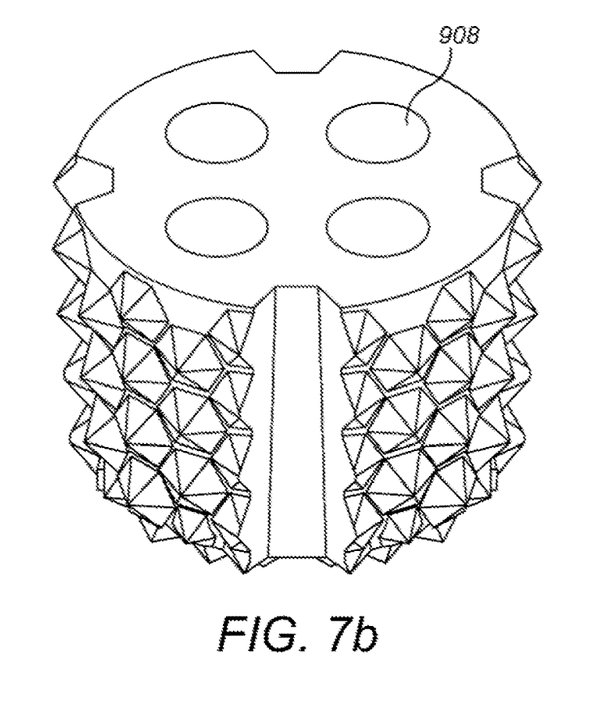

FIGS. 7a and 7b show a further embodiment of a supported catalyst 902. Catalyst 902 has a cylindrical macrostructure with four equally spaced parallel bores 908 extending longitudinally from opposite sides of supported catalyst 902 and four equally spaced grooves 904 on the outer face of the supported catalyst 902. Each groove is tapered along the width from a largest width at the upper face of the catalyst to a narrowest width at the bottom face of the catalyst. Catalyst 902 has a plurality of upwardly projecting hexagonal pyramid shaped surface structure mounds 906. Surface structures 906 extend over substantially all of the side and bottom faces of supported catalyst 902 apart from the base and side faces of grooves 904. The top face of catalyst 902 has no surface structures.

To produce supports, supported catalysts and inert packing member according to the invention, a reactor was modelled using 3D modelling to produce a digital model of the optimum macrostructure and surface features to provide high geometric surface area in combination with excellent packing characteristics and low pressure drop.

A precursor for a mould operable to produce the designed packing member was then produced using additive manufacturing with a 3D printer.

The printed precursor was then used to produce a mould for casting the designed packing member. The mould was arranged on the moulding apparatus and a moulding composition prepared and moulded. The resultant green body was calcined before dipping in a solution comprising the catalytic material.

Supported Catalyst Example 1

Supported catalyst example 1 according to the present invention was produced from a moulding composition formed by mixing the components provided below using the following method.

The alumina powder, pore former and dispersant were mixed to form a powder mixture. An aqueous monomer solution containing the chain forming monomer, the chain linking monomer and the water was added to the powder mixture to form an aqueous slurry. The catalyst and initiator were then added to the aqueous slurry. The amounts of each component in the resulting slurry were:

|  | Amount |
| --- | --- |
| Alumina powder | 475 |
| Pore former | 60 g |
| Dispersant | 12.25 g |
| Polymerisable monomer | 16.3 g |
| Crosslinking member | 8.2 |
| Catalyst | 3 ml |
| Initiator | 8 ml |
| Water | 135 g |

The resulting aqueous slurry was then cast into the mould. Once the slurry had gelled into a solid green body after 4-5 mins it was then demoulded. At this point the green body support had a rubbery, jelly-like consistency. The green body was then left to dry at room temperature for 24 hours. The dried green body was then fired to 1450° C., at which point the binder and pore formers were burnt off to leave a solid, porous, supported catalyst.

The support was then dipped in an aqueous solution containing catalytic material $Ni(NO_3)^2$ before drying at 500° C. This catalytic material impregnation step was repeated two more times to produce the final supported catalyst.

Supported catalyst example 1 had a macrostructure and surface structure according to supported catalyst 602 as shown in FIG. 4. Supported catalyst 1 was a high activity catalyst for DRI production due to having a higher concentration of catalytic material on the support then the other example catalysts which was achieved by repeated dipping of the support into the aqueous solution of the catalytic material.

Supported Catalyst Example 2

Supported catalyst example 2 was produced from the same composition and method as used for supported catalyst example 1 with the exception that the impregnation step was only carried out twice. Supported catalyst example 2 had a macrostructure and surface structure according to supported catalyst 702 as shown in FIG. 5. Supported catalyst example 2 was a semi-active catalyst for DRI production.

Inert Packing Member Example 1

Inert packing member example 1 was produced from the same composition and method as used for supported catalyst example 2 with the exception that no pore formers were used and the packing member was not dipped into the solution of catalytic material. Inert packing member example 1 also has a smooth outer surface with no surface structures. Supported catalyst 3 was therefore used as an inert packing member for DRI production.

Catalyst Bed Example 1

Fractions of supported catalyst examples 1 to 2 and inert packing member example 1 were combined in layers to produce catalyst bed example 1. The properties of each layer is provided in Table 1.

Comparative Supported Catalyst Example 1

Comparative supported catalyst example 1 was produced from an alumina based ceramic composition and formed using pelleting. Comparative supported catalyst example 1 had a macrostructure and surface structure according to comparative supported catalyst 102 as shown in FIG. 1*a*. Supported catalyst example 1 was a high activity catalyst for DRI production.

Comparative Supported Catalyst Example 2

Comparative supported catalyst example 2 was produced from the same composition using the same method as comparative supported catalyst example 1.

Comparative supported catalyst example 2 had a macrostructure and surface structure according to comparative supported catalyst 202 as shown in Figure 1*b*. Supported catalyst example 2 was a semi-active catalyst for DRI production.

Comparative Inert Packing Member Example 1

Comparative inert packing member example 1 was produced from the same composition using the same method as comparative supported catalyst example 1 with the exception that inert packing member example 1 was not impregnated with catalytic material. Inert packing member example 1 had a macrostructure and surface structure according to comparative supported catalyst 302 as shown in FIG. 1*c*. Supported catalyst example 3 was an inert packing member for DRI production.

Comparative Catalyst Bed Example 1

Fractions of comparative supported catalyst examples 1 to 2 and comparative inert packing member example 1 were combined in layers to produce comparative catalyst bed example 2. The properties of each layer s provided in Table 2.

TABLE 1

Catalyst bed example 1

| Ex. | Catalyst activity | Packing height (m) | Number of pellets | GSA ($cm^2/cm^3$) | Pressure drop (Pa, 453 $m^3$/hr flow) | Voidage (%) | Side crush (kgf) | Porosity |
|---|---|---|---|---|---|---|---|---|
| SC Ex. 1 | High* | 4.0 | 9,352 | 2.420 | 10,240 | 45.1 | 100% >220 | 30% |
| SC Ex. 2 | Semi-active** | 3.0 | 4,365 | 1.78 | 6,000 | 39.2 | 100% >300 | 30% |
| IPM Ex. 1 | Inert*** | 1.0 | 1,455 | 1.63 | 2,000 | 39.1 | 100% >300 | 10% |
| Total | | 8.0 | 15,172 | 1.94 | 18,240 | 41.1 | 100% >220 | |

*OW of 35.1 mm, OD2 of 38.0 mm
**OD1 of 33 mm, weight of 27 g.
***OD1 of 33 mm weight of 27 g.

TABLE 2

Comparative catalyst bed example 1

| C. Ex. | Activity | Packing height (m) | Number of pellets | GSA ($cm^2/cm^3$) | Pressure drop (Pa, 453 $m^3$/hr flow) | Voidage (%) | Side crush (kgf) | Porosity (%) |
|---|---|---|---|---|---|---|---|---|
| C. SC Ex. 1 | High* | 4.0 | 7,260 | 1.97 | 9,780 | 41.9 | Av. 110 | 18 |
| C. SC Ex. 2 | Semi-active** | 3.0 | 3,558 | 1.60 | 6,120 | 44.4 | Av. 120 | 12 |
| C. IPM Ex. 1 | Inert*** | 1.0 | 1,142 | 1.35 | 3,840 | 41.5 | Av. 250 | 4 |
| Total | | 8.0 | 11,960 | 1.75 | 19,740 | 42.8 | Av. 130 | |

*OD1 of 32.9 mm, OD2 of 26.9 mm, ID of 5.2 mm, length of 17.5 mm, weight 24.5 g.
**OD1 of 32.4 mm, OD2 of 23.3 mm, ID of 11.4 mm, length of 28.6 mm, weight 40.2 g.
***OD1 of 31.4 mm, ID of 16.1 mm, length of 31.3 mm, weight of 57.4 g.

The results of Tables 1 and 2 are compared in Table 3.

TABLE 3

Comparison of results

| | Packing height (m) | Number of pellets | GSA ($cm^2/cm^3$) | Pressure drop (Pa, 453 $m^3$/hr flow) | Voidage (%) | Side crush (kgf) |
|---|---|---|---|---|---|---|
| Comparative example 1 | 8.0 | 11,960 | 1.75 | 19,740 | 42.8 | Av. 130 |
| Example 1 | 8.0 | 15,172 | 1.94 | 18,240 | 41.1 | 100 > 220 |
| Difference | | 3,212 | +10.9 | −7.6 | −3.5% | At least +70% |

As shown by Table 3, the packed catalyst bed containing supported catalysts and inert packing member according to the present invention provide a combination of significantly superior geometric surface area with a lower pressure drop, increased porosity, and significantly higher mechanical integrity.

Support Example 1

Support example 1 was produced from the same composition and method as supported catalyst example 1 with the exception that support example 1 was not impregnated with catalytic material. Support example 1 had a macrostructure and surface structure according to support 402 as shown in FIG. 2*a*.

Support Example 2

Support example 2 was produced from the same composition and method as supported catalyst example 1 with the exception that support example 2 was not impregnated with catalytic material. Support example 2 had a macrostructure and surface structure according to support 502 as shown in FIG. 3.

Comparative Support Example 1

Comparative support example 1 was produced from the same composition and method as supported catalyst example 1 with the exception that comparative support example 1 was not impregnated with catalytic material. Comparative support example 1 had the same spherical macrostructure as support examples 1 and 2 but had a smooth outer face and therefore no surface structures.

Table 4 provides a comparison of support examples 1 and 2 with comparative support example 1.

TABLE 4

Comparison of supported catalysts

| Example | Number of packed pellets* | GSA per piece ($cm^2$) | GSA ($cm^2/cm^3$) | Change in GSA | Porosity (%) | Side crush (kgf) |
|---|---|---|---|---|---|---|
| Comp. Example 1 | 1455 | 55.5 | 1.65 | — | 30 | >300 kg |
| Example 1 | 1455 | 64.6 | 1.91 | +16% | 30 | >300 kg |
| Example 2 | 1455 | 103.3 | 3.06 | +86% | 30 | >300 kg |

*in a 1 m section of a 250 mm diameter tube

As shown by the data above, supports and supported catalysts according to the present invention show a significant increase in geometric surface area when compared to untextured supports. Furthermore, the increased geometric surface area is achieved in combination with reduced pressure drop, improved side crush strength and higher porosity.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The Invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A packing member for use in a packed bed comprising a ceramic material and wherein the packing member has:
   a geometric surface area per volume of ≥0.7 cm$^2$/cm$^3$ and a side crush strength of ≥5.7 kg/mm;
   wherein the packing member optionally has a porosity of at least 6%, and wherein the packing member has a macrostructure and comprises surface structures on the outer face of the macrostructure, wherein the packing member comprises surface structures extending over at least 60% of the outer face of the macrostructure.

2. The packing member according to claim 1, wherein the packing member is a cast packing member formed from a moulding composition comprising an organic binder component, a ceramic material, optionally a pore forming component, optionally a polymerisation initiator, and optionally a polymerisation accelerator.

3. The packing member according to claim 1, wherein the packing member is gel cast from a composition comprising a ceramic material, an organic binder component, optionally a pore forming component, optionally a polymerisation initiator, and optionally a polymerisation accelerator.

4. The packing member according to claim 1, wherein the packing member has a geometric surface area per volume (GSA) of ≥1 cm$^2$/cm$^3$, with a side crush strength of ≥8.3 kg/mm.

5. The packing member according to claim 1, wherein the packing member has a GSA of ≥1.7 cm$^2$/cm$^3$.

6. The packing member according to claim 1, wherein the packing member has a porosity of ≥15%.

7. The packing member according to claim 1, wherein the macrostructure of the packing member is in the form of a cog and at least some of the castellations of the cog are tapered along the depth and/or the width of the castellations, and/or the macrostructure has a depressed upper and/or lower face.

8. The packing member according to claim 1, wherein the surface structures are in the form of ridges and/or mounds.

9. The packing member according to claim 2, wherein the organic binder component comprises a polymerisable monomer and a crosslinking member.

10. The packing member according to claim 9, wherein the polymerisable monomer comprises one or more type of ethylenically unsaturated monomers.

11. The packing member according to claim 9, wherein the polymerisable monomer comprises one or more acrylamide monomers.

12. The packing member according to claim 9, wherein the crosslinking member is selected from one or more of a diethylenically unsaturated monomer.

13. The packing member according to claim 9, wherein the crosslinking member is selected from one or more of poly(ethylene glycol) dimethacrylate (PEGDMA), N,N'-methylenebis(acrylamide) (BIS), ammonium acrylate and PEG methylethylmethacrylate (PEGMEM).

14. The packing member according to claim 9, wherein the organic binder component comprises from 40 to 95 wt % of a polymerisable monomer and from 60 to 5 wt % of a crosslinking member.

15. The packing member according to claim 2, wherein the composition comprises a pore forming material having a particle size distribution wherein D10 is from 5 to 100 μm, and/or the D50 of the pore forming material is from 50 to 200 μm, and/or the D90 of the pore forming material is from 120 to 300 μm.

16. The packing member according to claim 1, wherein the ceramic material comprises aluminium oxide, aluminium silicate, magnesium aluminate, calcium aluminate, zirconia, silica, titanate, carbon and/or magnesium oxide.

17. The packing member according to claim 1, wherein the ceramic material has a particle size distribution wherein D10 is from 0.1 to 20 μm, and/or the D50 is from 0.5 to 30 μm, and/or the D90 is from 10 to 100 μm.

18. The packing member according to claim 1, wherein the packing member comprises a promoter selected from one or more oxides of lanthanum, copper, magnesium, manganese, potassium, calcium, zirconium, barium, cerium, sodium, lithium, molybdenum, yttrium, cobalt, and chromium.

19. The packing member according to claim 1, wherein the packing member comprises a dispersant.

20. The packing member according to claim 2, wherein the composition comprises from 0.1 to 10% of polymerisable monomer by dry weight of the composition.

21. The packing member according to claim 2, wherein the composition comprises from 0.1 to 10% of crosslinking member by dry weight of the composition.

22. The packing member according to claim 2, wherein the composition comprises from 50 to 95% of ceramic material by dry weight of the composition.

23. The packing member according to claim 2, wherein the composition comprises from >0 to 40% of pore forming member by dry weight of the composition.

24. The packing member according to claim 2, wherein the composition comprises from 0.1 to 5% of polymerisation initiator by dry weight of the composition.

25. The packing member according to claim 2, wherein the composition comprises up to 5% of polymerisation accelerator by dry weight of the composition.

26. The packing member according to claim 2, wherein the composition comprises from 0.1 to 10% of dispersant by dry weight of the composition.

27. A supported catalyst comprises the packing member according to claim 1 and a catalytic material comprising a metal selected from one or more of a transition metal, a transition metal oxide, and/or a noble metal or an alloy thereof.

* * * * *